US012795546B2

(12) United States Patent
Yang et al.

(10) Patent No.: US 12,795,546 B2
(45) Date of Patent: Nov. 10, 2026

(54) WAKEUP SIGNAL (WUS) RESOURCE CONFIGURATION FOR SIDELINK WIRELESS COMMUNICATIONS

(71) Applicant: QUALCOMM Incorporated, San Diego, CA (US)

(72) Inventors: Luanxia Yang, Beijing (CN); Jing Sun, San Diego, CA (US); Changlong Xu, Beijing (CN); Aleksandar Damnjanovic, Del Mar, CA (US); Xiaoxia Zhang, San Diego, CA (US); Shaozhen Guo, Beijing (CN); Chih-Hao Liu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 344 days.

(21) Appl. No.: 18/567,735

(22) PCT Filed: Aug. 30, 2021

(86) PCT No.: PCT/CN2021/115243

§ 371 (c)(1),
(2) Date: Dec. 6, 2023

(87) PCT Pub. No.: WO2023/028736

PCT Pub. Date: Mar. 9, 2023

(65) Prior Publication Data

US 2024/0284335 A1 Aug. 22, 2024

(51) Int. Cl.
*H04W 52/02* (2009.01)
*H04W 72/40* (2023.01)

(52) U.S. Cl.
CPC ....... *H04W 52/0235* (2013.01); *H04W 72/40* (2023.01)

(58) Field of Classification Search
CPC ............. H04W 52/0235; H04W 72/40; H04W 52/0216; H04W 52/0219; H04W 52/028; H04W 52/0229; Y02D 30/70
See application file for complete search history.

(56) References Cited

U.S. PATENT DOCUMENTS

| | | | | |
|---|---|---|---|---|
| 10,849,068 B2 * | 11/2020 | Liu | .................. | H04W 72/0446 |
| 2019/0090190 A1 * | 3/2019 | Liu | .................. | H04W 52/0235 |
| 2019/0363843 A1 * | 11/2019 | Gordaychik | .......... | H04L 1/0013 |
| 2021/0058866 A1 * | 2/2021 | Hosseini | ............... | H04W 72/23 |
| 2022/0248327 A1 * | 8/2022 | Yang | ................. | H04W 52/0219 |
| 2024/0015656 A1 * | 1/2024 | Do | .................... | H04W 52/0235 |

FOREIGN PATENT DOCUMENTS

WO 2021165208 A1 8/2021

OTHER PUBLICATIONS

International Search Report and Written Opinion—PCT/CN2021/115243—ISA/EPO—Feb. 14, 2022.

* cited by examiner

*Primary Examiner* — Afshawn M Towfighi
(74) *Attorney, Agent, or Firm* — SEYFARTH SHAW LLP

(57) ABSTRACT

A method of wireless communication by a sidelink user equipment (UE) includes selecting a sidelink wakeup signal (WUS) resource from a dedicated sidelink WUS resource pool. The sidelink WUS resource pool differs from a sidelink data transmission resource pool. The method also includes transmitting, to a receiver, a WUS on the selected sidelink WUS resource.

30 Claims, 6 Drawing Sheets

WAKEUP SIGNAL (WUS) RESOURCE CONFIGURATION FOR SIDELINK WIRELESS COMMUNICATIONS

FIELD OF THE DISCLOSURE

The present disclosure relates generally to wireless communications, and more specifically to wakeup signal (WUS) resource configurations for sidelink communications.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method of wireless communication by a sidelink user equipment (UE) includes selecting a sidelink wakeup signal (WUS) resource from a dedicated sidelink WUS resource pool. The sidelink WUS resource pool differs from a sidelink data transmission resource pool. The method also includes transmitting, to a receiver, a WUS on the selected sidelink WUS resource.

In other aspects of the present disclosure, a method of wireless communication by a receiving sidelink user equipment (UE) includes determining a sidelink wakeup signal (WUS) resource from a dedicated sidelink WUS resource pool. The sidelink WUS resource pool differs from a sidelink data transmission resource pool. The method further includes processing a WUS on the determined sidelink WUS resource.

Other aspects of the present disclosure are directed to an apparatus for wireless communication by a sidelink user equipment (UE) having a memory and one or more processor(s) coupled to the memory. The processor(s) is configured to select a sidelink wakeup signal (WUS) resource from a dedicated sidelink WUS resource pool. The sidelink WUS resource pool differs from a sidelink data transmission resource pool. The processor(s) is further configured to transmit, to a receiver, a WUS on the selected sidelink WUS resource.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
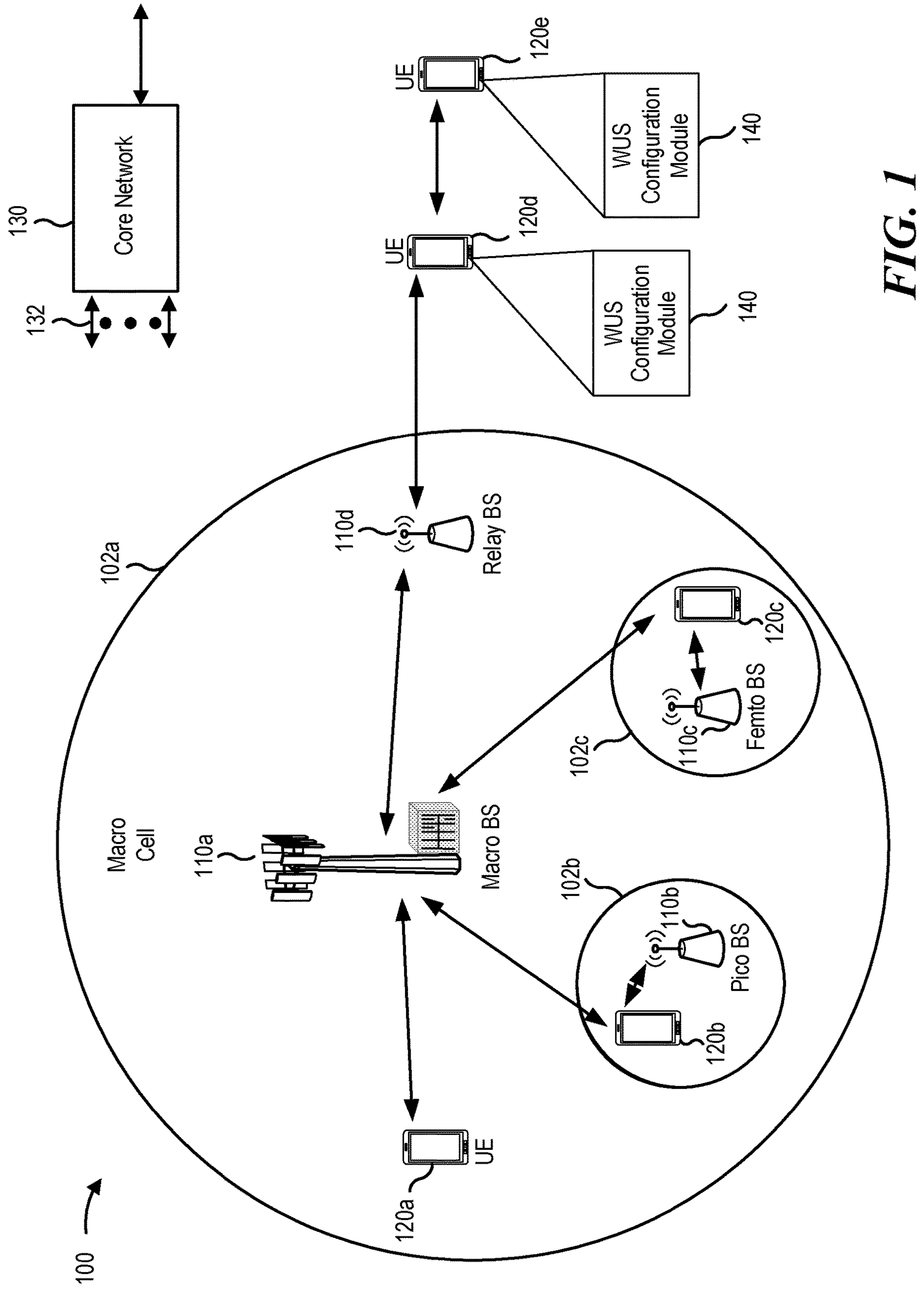
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In cellular communications networks, wireless devices may generally communicate with each other via one or more network entities such as a base station or scheduling entity. Some networks may support device-to-device (D2D) communications that enable discovery of, and communications with, nearby devices using a direct link between devices (e.g., without passing through a base station, relay, or another node). D2D communications can enable mesh networks and device-to-network relay functionality. Some examples of D2D technology include Bluetooth pairing, Wi-Fi Direct, Miracast, and LTE-D. D2D communications may also be referred to as point-to-point (P2P) or sidelink communications.

D2D communications may be implemented using licensed or unlicensed bands. Additionally, D2D communications can avoid the overhead involving the routing to and from the base station. Therefore, D2D communications can improve throughput, reduce latency, and/or increase energy efficiency.

A type of D2D communication is sidelink (SL) communications, which refers to the communications among user equipment (UE) without tunneling through a base station (BS) and/or a core network. Sidelink communications can be communicated over a physical sidelink control channel (PSCCH) and a physical sidelink shared channel (PSSCH). The PSCCH and PSSCH are similar to a physical downlink control channel (PDCCH) and a physical downlink shared channel (PDSCH) in downlink (DL) communications between a base station and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communications may include, among others, vehicle-to-everything (V2X), industrial internet of things (IIoT), and/or NR-lite.

Sidelink transmissions may take place in transmission or reception resource pools. A minimum resource allocation unit is a subchannel in the frequency domain and slot in the time domain. Radio resource control (RRC) configuration can be by a pre-configuration preload on the UE or a configuration received from a base station.

According to aspects of the present disclosure, power saving for sidelink communications may be achieved by introducing a wakeup signal (WUS) to sidelink communications. Aspects of the present disclosure relate to configuring and transmitting a sidelink WUS. To enable a sidelink WUS for sidelink power savings, a dedicated sidelink WUS resource pool is defined separately from a normal data (PSCCH/PSSCH) transmission resource pool. When a UE would like to send a WUS to another UE, the transmitting UE selects a resource from a sidelink WUS resource pool to send the WUS. Multiple options exist for determining the sidelink WUS resource pool from which the transmitting UE will select transmission resources.

A first option is receiver dependent resource selection where a predefined set of resources are assigned to the receiving UE. The receiving UE monitors the assigned resource pool for the WUS. A second option is transmitter dependent resource selection. With transmitter dependent resource selection, the transmitting UE randomly selects the resource from a sidelink WUS resource pool. The transmitting UE performs a sensing procedure where the transmitter senses communications in the sidelink WUS resource pool to autonomously occupy and reserve channel access. As such, the receiving UE monitors the entire sidelink WUS resource pool. A third option is transmitter and receiver dependent resource selection. With transmitter and receiver dependent resource selection, the transmitter and receiver negotiate to set up a set of resources for the WUS. The transmitter then selects a resource to use from the negotiated sidelink WUS resource pool. Thus, the receiver need not monitor all resources for the WUS, instead monitoring only the assigned resources. For the described options, the receiver performs blind detection across all possible resources for the WUS. To further reduce power consumption, a dedicated control resource set (CORESET) and search space for the WUS may be configured.

Aspects of the present disclosure define a structure of the sidelink WUS resource pool. In some aspects, a structure of the sidelink WUS resource pool supports time division multiplexing (TDM), frequency division multiplexing (FDM) and/or spatial division multiplexing (SDM). Thus, multiple time division multiplexed, frequency division multiplexed and/or spatial division multiplexed WUSs may be placed into a single slot. In some aspects, each WUS may have its own automatic gain control (AGC) resource and gap. One symbol may be allocated for automatic gain control, one symbol for a gap for each user's WUS, and one symbol for the WUS. Thus, three symbols are allocated for each user. Alternatively, one-half of a symbol is allocated for automatic gain control and one-half of a symbol is allocated for a gap for each user's WUS. The WUS itself is allocated a full symbol. Thus, two symbols are allocated for each user. With this structure, resource efficiency may be improved.

To further improve resource utilization, additional structures are proposed where a gap and/or AGC may be shared across time division multiplexed WUS resources within a slot. In some aspects, time division multiplexed WUS resources in a slot share the same automatic gain control symbol. Thus, a WUS in the middle of the slot will use the same automatic gain control symbol as a WUS in the beginning or end of the slot. In other aspects, time division multiplexed WUSs in a slot share the same automatic gain control symbol and also share the same gap symbol. The AGC symbol may be provided in the beginning of the slot while the gap may be provided at the end of the slot. This structure further improves the resource utilization.

According to aspects of the present disclosure, a dedicated sidelink WUS resource pool may be multiplexed with a data/control resource pool. In some aspects, the WUS resource pool and data/control resource pool may be configured in different slots. In other aspects, the WUS resource pool and data/control resource pool may be frequency division multiplexed in different subchannels. In some aspects, a base station may ensure the configuration will not include overlapping resources. In other aspects, priority rules may be defined.

In other aspects of the present disclosure, the WUS resource pool and data/control resource pool may be time division multiplexed within a slot. The resource pool location may be fixed or variable within the slot. Rules to shrink the data/control resource pool to avoid overlapping with WUS resource may also be introduced.

Aspects of the present disclosure enable power savings for sidelink communications by introducing a WUS to sidelink communications. The various disclosed resource configurations and slot structures may improve resource utilization while still achieving power savings.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, an NR BS, a Node B, a gNB, a 5G node B, an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. ABS may support one or multiple (e.g., three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communications between the BS 110*a* and UE 120*d*. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110*a*, BS 110*b*, BS 110*c*, and BS 110*d*) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120*a*, 120*b*, 120*c*) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless communications system 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

Certain UEs 102*d*, 102*e* may communicate with each other using a device-to-device (D2D) communications link. The D2D communications link may use the downlink/uplink (DL/UL) wireless wide area network (WWAN) spectrum. The D2D communications link may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth, ZigBee, Wi-Fi based on the IEEE 802.11 standard, LTE, or NR.

In some aspects, a first UE 120*d* and/or a second UE 120*e* may be configured to communicate in a licensed radio frequency spectrum and/or a shared radio frequency spectrum. The shared radio frequency spectrum may be unlicensed, and therefore multiple different technologies may use the shared radio frequency spectrum for communications, including new radio (NR), LTE, LTE-Advanced, licensed assisted access (LAA), dedicated short range communications (DSRC), MuLTEFire, 4G, and the like. The foregoing list of technologies is to be regarded as illustrative, and is not meant to be exhaustive.

The D2D communications system may use NR radio access technology. Of course, other radio access technologies, such as LTE radio access technology, may be used. In D2D communications (e.g., vehicle-to-everything (V2X) communications or vehicle-to-vehicle (V2V) communications), the UEs 120*d*, 120*e* may be on networks of different mobile network operators (MNOs). Each of the networks may operate in its own radio frequency spectrum. For example, the air interface to the first UE 120*d* (e.g., Uu interface) may be on one or more frequency bands different from the air interface of the second UE 120*e*. The first UE 120*d* and the second UE 120*e* may communicate via a sidelink component carrier, for example, via the PC5 interface. In some examples, the (MNOs may schedule sidelink communications between or among the UEs 120*d*, 120*e* in a licensed radio frequency spectrum and/or a shared radio frequency spectrum (e.g., 5 GHz radio spectrum bands).

The shared radio frequency spectrum may be unlicensed, and therefore different technologies may use the shared radio frequency spectrum for communications. In some aspects, a D2D communications (e.g., sidelink communications) between or among the UEs 120*d*, 120*e* are not scheduled by MNOs.

In conventional systems, a base station 110*a* assigns resources to the UEs for device-to-device (D2D) communications (e.g., V2X communications and/or V2V communications). For example, the resources may be a pool of uplink (UL) resources, both orthogonal (e.g., one or more frequency division multiplexing (FDM) channels) and non-orthogonal (e.g., code division multiplexing (CDM)/resource spread multiple access (RSMA) in each channel). The base station 110*a* may configure the resources via the PDCCH (e.g., faster approach) or radio resource control (RRC) (e.g., slower approach).

In some systems, each UE 120*d*, 120*e* autonomously selects resources for D2D communications. For example, each UE 120*d*, 120*e* may sense and analyze channel occupation during the sensing window. The UEs 120*d*, 120*e* may use the sensing information to select resources from the sensing window. One UE 120*d* may assist another UE 120*e* in performing resource selection. The UE 120*d* providing assistance may be referred to as the receiver UE or partner UE, which may potentially notify the transmitter UE 120*e*. The transmitter UE 120*e* may transmit information to the receiving UE 120*d* via sidelink communications.

The D2D communications (e.g., V2X communications and/or V2V communications) may be carried out via one or more sidelink carriers. The one or more sidelink carriers may include one or more channels, such as a physical sidelink broadcast channel (PSBCH), a physical sidelink discovery channel (PSDCH), a physical sidelink shared channel (PSSCH), and a physical sidelink control channel (PSCCH), for example.

In some examples, the sidelink carriers may operate using the PC5 interface. The first UE 120*d* may transmit to one or more (e.g., multiple) devices, including to the second UE 120*e* via the first sidelink carrier. The second UE 120*e* may transmit to one or more (e.g., multiple) devices, including to the first UE 120*d* via the second sidelink carrier.

In some aspects, the UL carrier and the first sidelink carrier may be aggregated to increase bandwidth. In some aspects, the first sidelink carrier and/or the second sidelink carrier may share the first frequency spectrum (with a first network) and/or share the second frequency spectrum (with the a second network). In some aspects, the sidelink carriers may operate in an unlicensed/shared radio frequency spectrum.

In some aspects, sidelink communications on a sidelink carrier may occur between the first UE 120*d* and the second UE 120*e*. In some aspects, the first UE 120*d* may perform sidelink communications with one or more (e.g., multiple) devices, including the second UE 120*e* via the first sidelink carrier. For example, the first UE 120*d* may transmit a broadcast transmission via the first sidelink carrier to multiple devices (e.g., the second UE 120*e* and a third UE (not shown)). The second UE 120*e* (e.g., among other UEs) may receive such broadcast transmission. Additionally or alternatively, the first UE 120*d* may transmit a multicast transmission via the first sidelink carrier to the multiple devices (e.g., the second UE 120*e* and third UEs). The second UE 120*e* and/or the third UE (e.g., among other UEs) may receive such multicast transmission. The multicast transmissions may be connectionless or connection-oriented. A multicast transmission may also be referred to as a groupcast transmission.

Furthermore, the first UE 120*d* may transmit a unicast transmission via the first sidelink carrier to a device, such as the second UE 120*e*. The second UE 120*e* (e.g., among other UEs) may receive such unicast transmission. Additionally or alternatively, the second UE 120*e* may perform sidelink communications with one or more (e.g., multiple) devices, including the first UE 120*d* via the second sidelink carrier. For example, the second UE 120*e* may transmit a broadcast transmission via the second sidelink carrier to the multiple devices. The first UE 120*d* (e.g., among other UEs) may receive such broadcast transmissions.

In some aspects, for example, such sidelink communications on a sidelink carrier between the first UE 120*d* and the second UE 120*e* may occur without having MNOs allocating resources (e.g., one or more portions of a resource block (RB), slot, frequency band, and/or channel associated with a sidelink carrier) for such communications and/or without scheduling such communications. Sidelink communications may include traffic communications (e.g., data communications, control communications, paging communications and/or system information communications). Further, sidelink communications may include sidelink feedback communications associated with traffic communications (e.g., a transmission of feedback information for previously-received traffic communications). Sidelink communications may employ at least one sidelink communications structure having at least one feedback symbol. The feedback symbol of the sidelink communications structure may allot for any sidelink feedback information that may be communicated in the device-to-device (D2D) communications system between devices (e.g., the first UE 120*d*, and/or the second UE 120*e*). As discussed, a UE may be a vehicle, a mobile device, or another type of device. In some cases, a UE may be a special UE, such as a road side unit (RSU).

The UEs 120 may include a WUS configuration module 140. For brevity, only the UEs 120*d*, 120*e* are shown as including the WUS configuration module 140. The WUS configuration module 140 may select a sidelink wakeup signal (WUS) resource from a dedicated sidelink WUS resource pool. The sidelink WUS resource pool differs from a sidelink data transmission resource pool. The WUS configuration module 140 may also transmit, to a receiver, a WUS on the selected sidelink WUS resource.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

As indicated above, FIG. 1 is provided merely as an example. Other examples may differ from what is described with regard to FIG. 1.

Figure 2:
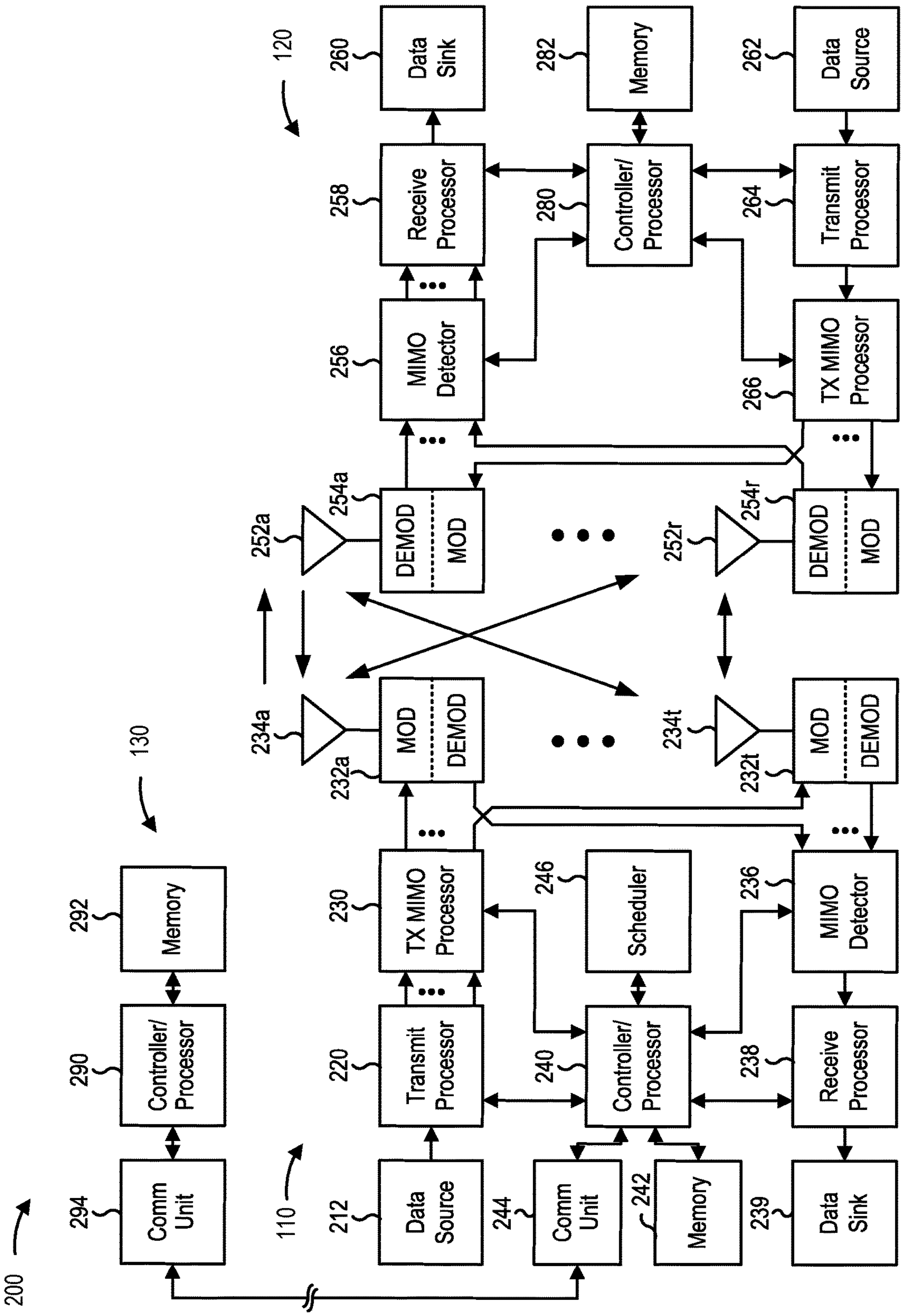
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with wakeup signal (WUS) resource configurations for sidelink communications, as described in more detail elsewhere. For example, the controller/processor 240 of the base station 110, the controller/processor 280 of the UE 120, and/or any other component(s) of FIG. 2 may perform or direct operations of, for example, the processes of FIGS. 6 and 7 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for selecting, means for transmitting, means for receiving, means for sensing, and means for negotiating. Such means may include one or more components of the UE 120 or base station 110 described in connection with FIG. 2.

As indicated above, FIG. 2 is provided merely as an example. Other examples may differ from what is described with regard to FIG. 2.

Third Generation Partnership Project (3GPP) Release 16 and beyond standardize sidelink (SL) communications for vehicle to everything (V2X) systems. V2X systems include devices that may communicate directly with each other. Direct communication may occur between vehicles, pedestrians, and infrastructure without relying on a cellular network. This peer-to-peer delivery of messages may include messages such as safety messages.

To implement sidelink communications, a sidelink transmitter uses sidelink control information (SCI) to occupy one or more sidelink sub-channel(s) to transmit one physical sidelink shared channel (PSSCH). Specifically, SCI includes two stages of control information. SCI stage 1 (SCI-1) transmits over a physical sidelink control channel (PSCCH), mainly for occupancy and/or reservation of sub-channel(s) to be understood by peers. SCI stage 2 (SCI-2) transmits over the PSSCH, and includes additional control information for targeted receiver(s).

Conventionally, two radio resource allocation (RRA) schemes are specified for sidelink communications. Mode 1 is for network controlled deployment, where the sidelink transmitter receives a grant from the base station for channel access. Mode 2 is for standalone deployment, where the sidelink transmitter conducts sensing to autonomously occupy and/or reserve channel access. Full sensing (e.g., up to one second) may be specified for safe channel access.

In 3 GPP Release 16, a wakeup signal (WUS) was standardized to improve power efficiency during connected mode discontinuous reception (C-DRX) operation. The wakeup signal (WUS) reduces occurrence of unnecessary wakeups while a UE is communicating with a base station. Without wakeup signals, the UE wakes up during each ON duration and returns to sleep mode after monitoring for downlink communications during the entire ON duration. With the introduction of the wakeup signal, the UE only wakes up for a given ON duration to receive downlink communications, after receiving the wakeup signal. The wakeup signal is transmitted during a pre-wakeup window where the UE does not have to monitor a regular physical downlink control channel (PDCCH). Thus, power consumption for WUS monitoring is reduced.

According to aspects of the present disclosure, power saving for sidelink communications may be achieved by introducing a WUS to sidelink communications. Aspects of the present disclosure relate to configuring and transmitting a sidelink WUS. Although the configuration of a sidelink WUS is UE-specific, the sidelink WUS may be shared by multiple UEs, such that UEs configured to monitor the same WUS will wake up together.

To enable a sidelink WUS for sidelink power savings, a dedicated sidelink WUS resource pool is defined separately from a normal data (PSCCH/PSSCH) transmission resource pool. When a UE would like to send a WUS to another UE, the transmitting UE selects a resource from a sidelink WUS resource pool to send the WUS. Multiple options exist for determining the sidelink WUS resource pool from which the transmitting UE will select transmission resources.

A first option is receiver dependent resource selection where a predefined set of resources are assigned to the receiving UE (e.g., User A). The receiving UE monitors the assigned resource pool for the WUS. Thus, if the UE transmitting the WUS (e.g., User B) would like to wake up User A, User B sends a WUS on a resource that is predefined for User A. User B may obtain a resource allocation for the WUS for User A from the base station. In other aspects, User B may obtain a resource allocation from User A directly, such as during an initial sidelink connection between User A and User B. That is, each user may inform connected users of the resource configuration.

A second option is transmitter dependent resource selection. With transmitter dependent resource selection, the transmitting UE randomly selects the resource from a sidelink WUS resource pool. The transmitting UE performs a sensing procedure where the transmitter senses communications in the sidelink WUS resource pool to autonomously occupy and reserve channel access. As such, the receiving UE monitors the entire sidelink WUS resource pool.

A third option is transmitter and receiver dependent resource selection. With transmitter and receiver dependent resource selection, the transmitter and receiver negotiate to set up a set of resources for the WUS. That is, the transmitter and receiver negotiate the sidelink WUS resource pool. The transmitter then selects a resource to use from the negotiated sidelink WUS resource pool. Thus, the receiver need not monitor all resources for the WUS, instead monitoring only the assigned resources.

For the described options, the receiver performs blind detection across all possible resources for the WUS. To further reduce power consumption, a dedicated control resource set (CORESET) and search space for the WUS may be configured, for example, with radio resource control (RRC) signaling from a base station. The CORESET may define a frequency range, while the search space may define a time duration and time position. In some aspects, the CORESET for WUS configuration may have a reduced bandwidth. By configuring different starting slots and durations, more UEs may be multiplexed. In some aspects, the search space is UE-specific. In other aspects, the search space is group-based.

Aspects of the present disclosure define a structure of the sidelink WUS resource pool. In some aspects, a structure of the sidelink WUS resource pool supports time division multiplexing (TDM), frequency division multiplexing (FDM) and/or spatial division multiplexing (SDM). Thus, multiple time division multiplexed, frequency division multiplexed and/or spatial division multiplexed WUSs may be placed into a single slot.

Figure 3A:
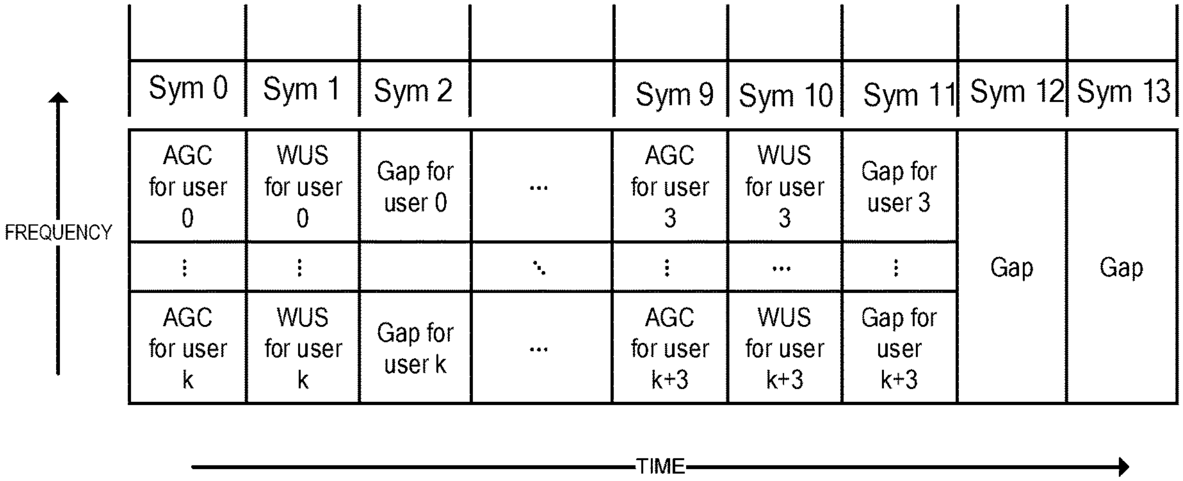
FIGS. 3A and 3B are block diagrams illustrating wakeup signal (WUS) resource pool structures, in accordance with aspects of the present disclosure.
Figure 3B:
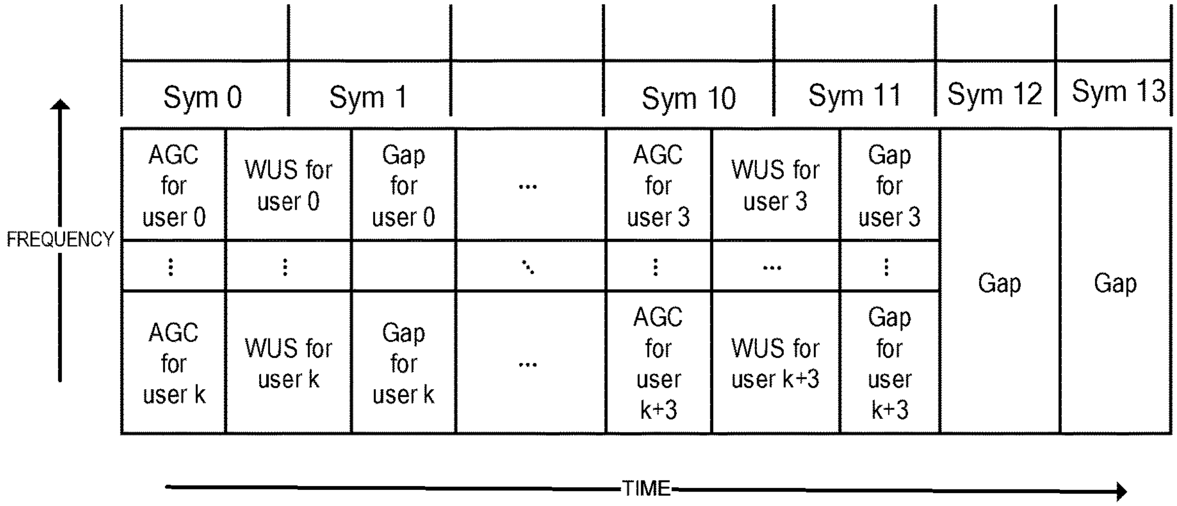

FIGS. 3A and 3B are block diagrams illustrating wakeup signal (WUS) resource pool structures, in accordance with aspects of the present disclosure. As seen in FIGS. 3A and 3B, each WUS may have an independent automatic gain control (AGC) resource and gap.

In FIG. 3A, one symbol is allocated for automatic gain control and one symbol is allocated for a gap for each user's WUS. Thus, three symbols are allocated for each user. For example, a WUS for a first user (e.g., user 0) is associated with AGC in symbol zero (Sym 0) and a gap in symbol two (Sym 2). The WUS itself is within symbol one (Sym 1). Similarly, symbols nine through eleven are assigned to AGC, a WUS, and a gap for a fourth user (e.g., user 3). With frequency division multiplexing, the WUS, gap, and AGC for a kth user may be provided in symbols zero though two. The WUS, gap, and AGC for a k+3 user may be provided in symbols nine though eleven. In the example shown in FIG. 3A, the last two symbols (Sym 12 and Sym 13) are gap symbols.

In FIG. 3B, one-half of a symbol is allocated for automatic gain control and one-half of a symbol is allocated for a gap for each user's WUS. The WUS itself is allocated a full symbol. Thus, two symbols are allocated for each user. With this structure, resource efficiency may be improved at the cost of a mixed symbol boundary within a slot. Referring to FIG. 3B, a WUS for a first user (e.g., user 0) is associated with AGC in the first half of symbol zero (Sym 0) and a gap in the second half of symbol one (Sym 1). The WUS is provided in the second half of symbol zero and the first half of symbol one. Similarly, symbols ten and eleven are assigned to AGC, a WUS, and a gap for a fourth user (e.g., user 3). With frequency division multiplexing, the WUS, gap, and AGC for a kth user may be provided in symbols zero and one. The WUS, gap, and AGC for a k+3 user may be provided in symbols ten and eleven. In the example shown in FIG. 3B, the last two symbols (Sym 12 and Sym 13) are gap symbols.

Figure 4A:
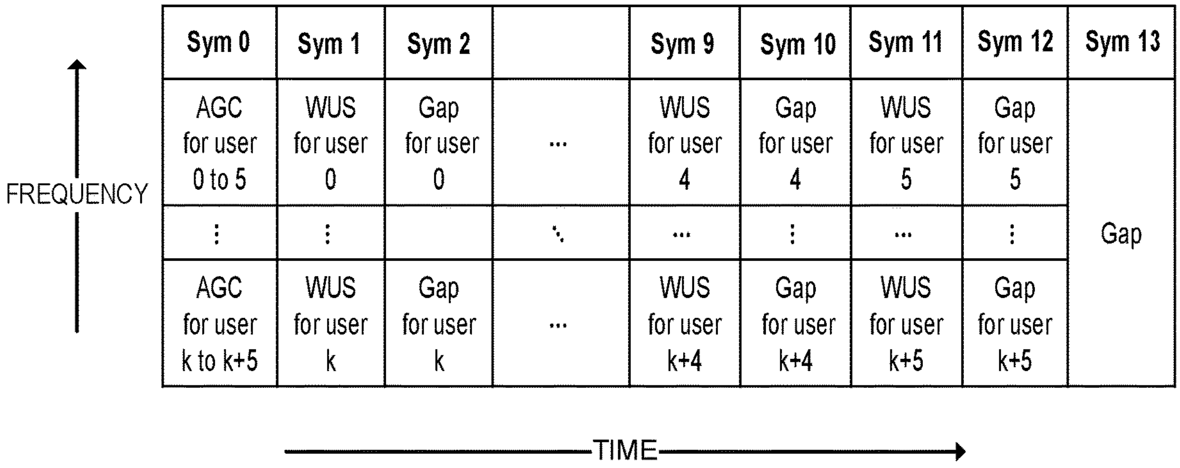
FIGS. 4A and 4B are block diagrams illustrating WUS resource pool structures, in accordance with aspects of the present disclosure.
Figure 4B:
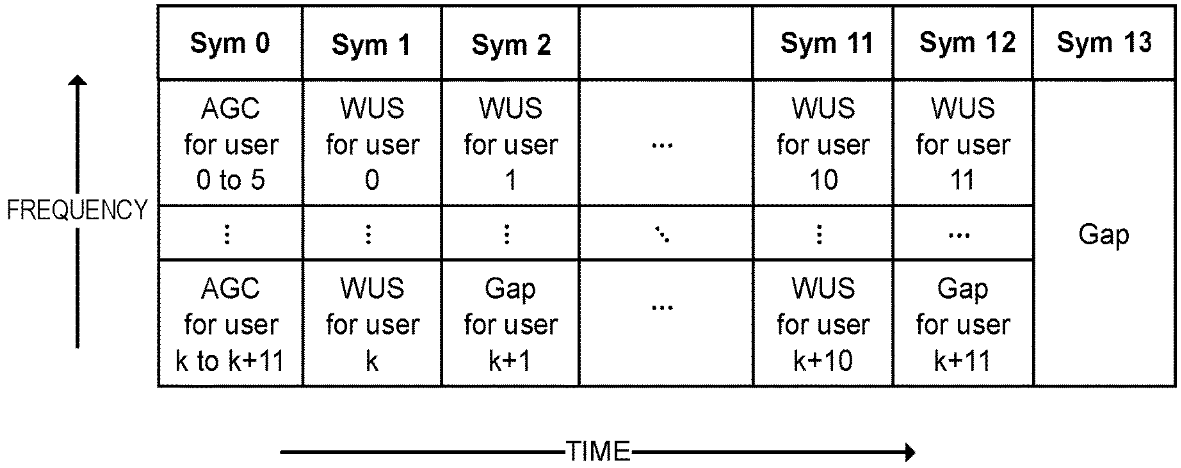

To further improve resource utilization, additional structures are proposed where a gap and/or AGC may be shared across time division multiplexed WUS resources within a slot. FIGS. 4A and 4B are block diagrams illustrating WUS resource pool structures, in accordance with these aspects of the present disclosure.

As seen in FIG. 4A, time division multiplexed WUS resources in a slot share the same automatic gain control symbol. Thus, a WUS in the middle of the slot will use the same automatic gain control symbol as a WUS in the beginning or end of the slot. In the example structure shown in FIG. 4A, each WUS resource has an independent gap symbol. As seen in FIG. 4A, a WUS for a first user (e.g., user 0) is associated with AGC in symbol zero (Sym 0) and a gap in symbol two (Sym 2). The WUS itself is provided in symbol one (Sym 1). The users assigned to symbols nine through twelve are also assigned to the AGC in symbol zero. More specifically, a WUS and a gap for a fifth user (e.g., user 4) and a sixth user (e.g., user 5) each rely on the AGC of symbol zero. With frequency division multiplexing, the WUS, gap, and AGC for a kth user may be provided in symbols zero though two. The WUS and gap for a k+4 user and k+5 user may be provided in symbols nine though twelve, relying on the AGC from symbol zero. In the example shown in FIG. 4A, the last symbol (Sym 13) is a gap symbol.

In other aspects, time division multiplexed WUSs in a slot share the same automatic gain control symbol and also share the same gap symbol. The AGC symbol may be provided in the beginning of the slot while the gap may be provided at the end of the slot. This structure further improves the resource utilization. However, with this structure, there is a possibility that a UE transmitting an earlier WUS may not be able to receive the WUS in the next time division multiplexed WUS resources and vice versa.

As seen in FIG. 4B, a WUS for a first user (e.g., user 0) is associated with AGC in symbol zero (Sym 0). The WUS itself is provided in symbol one (Sym 1). There is no gap specifically assigned to this user. Rather, the gap in symbol thirteen (Sym 13) is for all users allocated to this slot. The users assigned to symbols two through twelve are also assigned to the AGC in symbol zero and the gap in symbol thirteen. More specifically, a WUS for a second user (e.g., user 1), an eleventh user (e.g., user 10) and a twelfth user (e.g., user 11) each rely on the AGC of symbol zero. With frequency division multiplexing, the WUS and AGC for a kth user and k+1 user may be provided in symbols zero though two. The WUS for a k+10 user and k+11 user may be provided in symbols eleven and twelve, relying on the AGC from symbol zero. In the example shown in FIG. 4B, the last symbol (Sym 13) is the only gap symbol within the slot. That is, all users share the same gap symbol.

According to aspects of the present disclosure, a dedicated sidelink WUS resource pool may be multiplexed with a data/control resource pool. In some aspects, the WUS resource pool and data/control resource pool may be configured in different slots. In other aspects, the WUS resource pool and data/control resource pool may be frequency division multiplexed in different subchannels. In some aspects, a base station may ensure the configuration will not include overlapping resources. In other aspects, priority rules may be defined. For example, if a WUS resource pool and data/control resource pool overlap in a slot, the slot will only be used for WUS or data/control, depending on the priority rule.

Figure 5A:
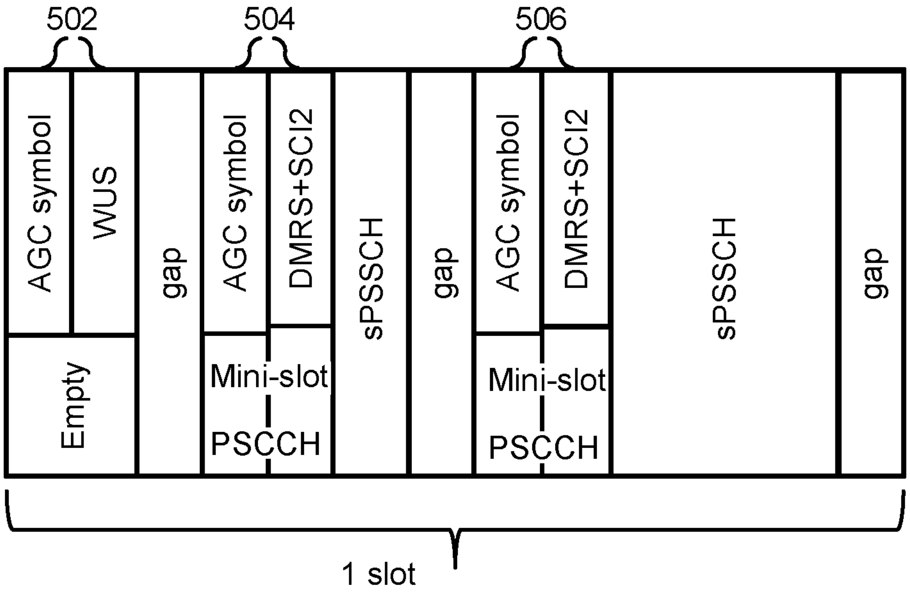
FIGS. 5A and 5B are block diagrams illustrating resource pool multiplexing, in accordance with aspects of the present disclosure.
Figure 5B:
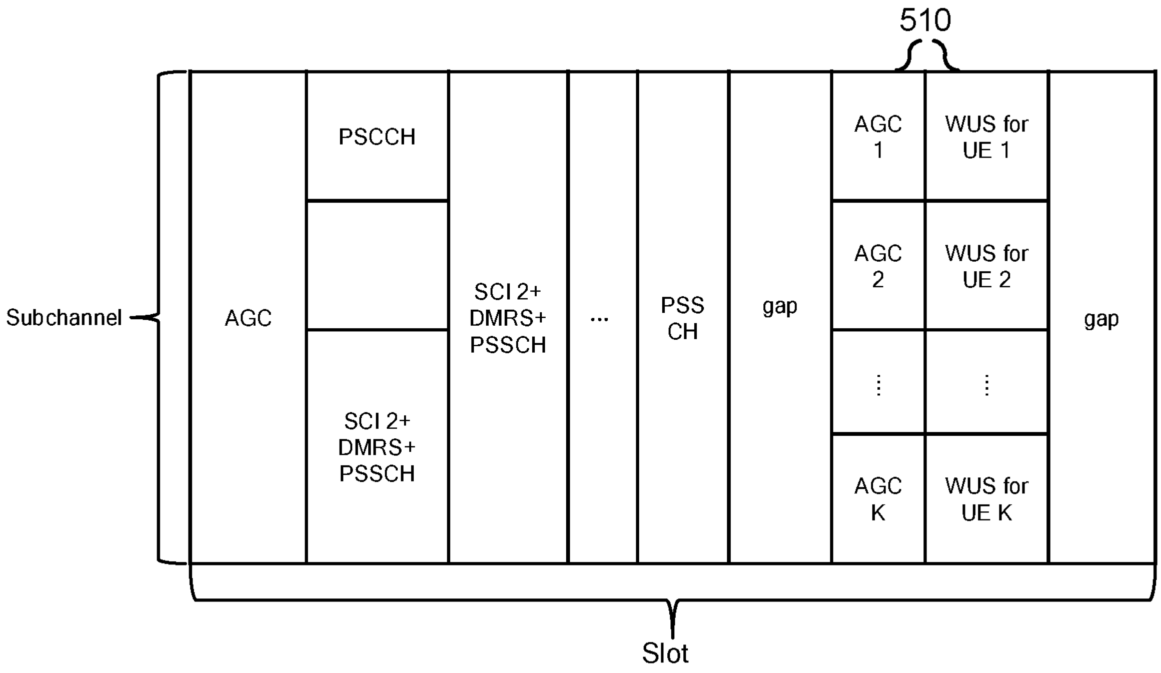

In other aspects of the present disclosure, the WUS resource pool and data/control resource pool may be time division multiplexed within a slot. FIGS. 5A and 5B are block diagrams illustrating resource pool multiplexing, in accordance with aspects of the present disclosure.

A conventional slot structure form for a PSCCH/PSSCH slot has a last symbol for a gap and a first symbol as a repetition of the second symbol for AGC. The PSCCH duration is (pre)configured to the first two or three symbols. S second sidelink control information (SCI-2) is piggybacked over the PSSCH and mapped to contiguous RBs in the PSSCH starting from the first symbol with a PSSCH demodulation reference signal (DMRS). Each mini-slot may have its own SCI-1/2, AGC symbol and gap. The mini-slot PSCCH may be used to schedule the PSSCH in each mini-slot. In other configurations, an AGC symbol is in front of every mini-slot, allow for AGC training for receiving from possibly different transmitters. A gap at the end of each mini-slot allows transmit and receive switching in the mini-slot boundary.

As seen in FIG. 5A, the WUS resource pool is located at a beginning 502 of the slot. The WUS resource pool includes the AGC and the WUS. The data/control resource pools appear later in the slot at locations 504 and 506. In the example of FIG. 5A, the resource pool locations are not fixed. For example, the sidelink WUS resource pool may occur at the location 504, instead of the location 502. In the example of FIG. 5B, the WUS resource pool appears in a fixed location 510, near the end of the slot. In the example of FIG. 5B, the WUS resource pool includes the AGC, WUS, and gap, occupying the last three symbols of the slot. Similar to when multiplexing in different slots, intra-slot multiplexing may rely on the base station to explicitly configure the resources for WUS and data/control without any overlapping. Rules to shrink the data/control resource pool to avoid overlapping with WUS resource may also be introduced.

Aspects of the present disclosure enable power savings for sidelink communications by introducing a WUS to sidelink communications. The various resource configurations and slot structures can improve resource utilization while still achieving power savings.

As indicated above, FIGS. 3A-5B are provided as examples. Other examples may differ from what is described with respect to FIGS. 3A-5B.

Figure 6:
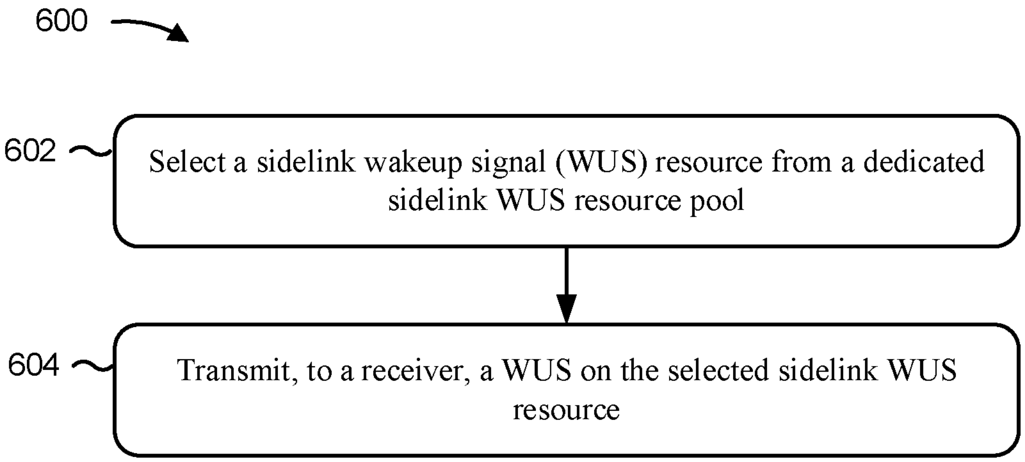
FIG. 6 is a flow diagram illustrating an example process performed, for example, by a transmitting sidelink user equipment (UE), in accordance with various aspects of the present disclosure.

FIG. 6 is a flow diagram illustrating an example process 600 performed, for example, by a transmitting sidelink user equipment (UE), in accordance with various aspects of the present disclosure. The example process 600 is an example of wakeup signal (WUS) resource configurations for sidelink communications. The operations of the process 600 may be implemented by a UE 120.

At block 602, the user equipment (UE) selects a sidelink wakeup signal (WUS) resource from a dedicated sidelink WUS resource pool. The sidelink WUS resource pool differs from a sidelink data transmission resource pool. For example, the UE (e.g., using controller/processor 280 and/or memory 282) may select the sidelink wake up signal resource. The selected sidelink WUS resource may be assigned to the receiver, for example, by a base station or another UE. In some aspects, the selecting may include sensing across the sidelink WUS resource pool, and randomly selecting the sidelink WUS resource based on the sensing. In other aspects, the selecting may include negotiating the sidelink WUS resource pool with another UE.

At block 604, the user equipment (UE) transmits, to a receiver, a WUS on the selected sidelink WUS resource. For example, the UE (e.g., using the antenna 252, DEMOD/MOD 254, TX MIMO processor 266, the transmit processor 264, controller/processor 280, and/or memory 282) may transmit the WUS. The receiver may wake up upon receiving the WUS.

Figure 7:
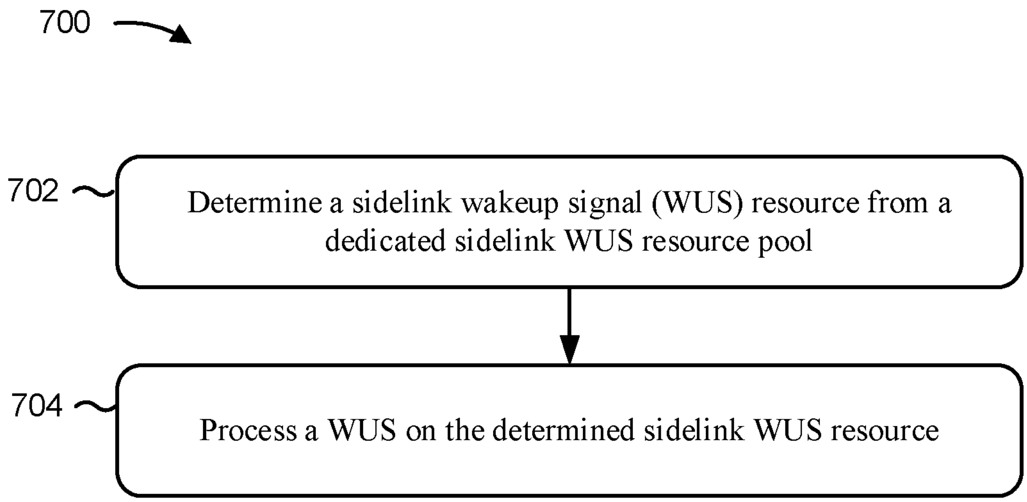
FIG. 7 is a flow diagram illustrating an example process performed, for example, by a receiving sidelink user equipment (UE), in accordance with various aspects of the present disclosure.

FIG. 7 is a flow diagram illustrating an example process 700 performed, for example, by a receiving sidelink user equipment (UE), in accordance with various aspects of the present disclosure. The example process 700 is an example of wakeup signal (WUS) resource configurations for sidelink communications. The operations of the process 700 may be implemented by a UE 120.

At block 702, the user equipment (UE) determines a sidelink wakeup signal (WUS) resource from a dedicated sidelink WUS resource pool. The sidelink WUS resource pool differs from a sidelink data transmission resource pool. For example, the UE (e.g., using controller/processor 280 and/or memory 282) may determine the WUS resource. The determined sidelink WUS resource may be assigned to the receiving sidelink UE, for example, by a base station or another UE. In some aspects, the selecting may include sensing across the sidelink WUS resource pool, and randomly selecting the sidelink WUS resource based on the sensing. In other aspects, the selecting may include negotiating the sidelink WUS resource pool with another UE.

At block 704, the user equipment (UE) processes a WUS on the determined sidelink WUS resource. For example, the UE (e.g., using controller/processor 280 and/or memory 282) may process the WUS. The UE may wake up, for example.

Implementation examples are described in the following numbered clauses.

1. A method of wireless communication by a sidelink user equipment (UE), comprising:
   selecting a sidelink wakeup signal (WUS) resource from a dedicated sidelink WUS resource pool, the sidelink WUS resource pool differing from a sidelink data transmission resource pool; and
   transmitting, to a receiver, a WUS on the selected sidelink WUS resource.
2. The method of clause 1, in which the selected sidelink WUS resource is assigned to the receiver.
3. The method of clause 1 or 2, further comprising receiving, from a base station, a configuration indicating the selected sidelink WUS resource.
4. The method of any clause 1 or 2, further comprising receiving, from the receiver, a configuration of the selected sidelink WUS resource.
5. The method of any of the preceding clauses, in which the selecting the sidelink WUS resource comprises:
   sensing across the sidelink WUS resource pool; and
   randomly selecting the sidelink WUS resource based on the sensing.
6. The method of any clauses 1-4, in which the selecting the sidelink WUS resource comprises negotiating the sidelink WUS resource pool with the receiver.

7. The method of any of the preceding clauses, further comprising receiving, from a base station, a control resource set (CORESET) and search space for the WUS.
8. The method of any of the preceding clauses, in which the WUS sidelink resource pool comprises time division multiplexed, frequency domain multiplexed, and/or space division multiplexed automatic gain control (AGC) resources and WUS resources for a plurality of users.
9. The method of any of the preceding clauses, in which each AGC resource is one symbol or one-half of a symbol, each gap is one symbol or one-half of a symbol, and each WUS resource is one symbol.
10. The method of any of clauses 1-8, in which each slot comprises an AGC resource comprising a single symbol for all of the plurality of users, and a gap between each WUS resource of each of the plurality of users, or each slot comprises a single AGC symbol at a beginning of a slot and a single gap symbol at an end of the slot.
11. The method of any of the preceding clauses, in which the sidelink WUS resource pool is in a first slot and the data transmission resource pool is in a second slot, different from the first slot.
12. The method of any of the preceding clauses, in which the sidelink WUS resource pool is in a first subchannel and the data transmission resource pool is in a second subchannel, different from the first subchannel.
13. The method of any of the preceding clauses, in which the sidelink WUS resource pool is time division multiplexed with the sidelink data transmission resource pool, within a slot.
14. A method of wireless communication by a receiving sidelink user equipment (UE), comprising:
determining a sidelink wakeup signal (WUS) resource from a dedicated sidelink WUS resource pool, the sidelink WUS resource pool differing from a sidelink data transmission resource pool; and
processing a WUS on the determined sidelink WUS resource.
15. The method of clause 14, in which the determined sidelink WUS resource is assigned to the receiving sidelink UE.
16. The method of clause 14 or 15, further comprising receiving, from a base station, a configuration indicating the determined sidelink WUS resource.
17. The method of any of the clauses 14-16, further comprising transmitting, to a transmitting sidelink UE, a configuration of the determined sidelink WUS resource.
18. The method of any of the clauses 14-17, further comprising monitoring all of the sidelink WUS resource pool to determine the sidelink WUS resource.
19. The method of any of the clauses 14-18, in which the determining the sidelink WUS resource comprises negotiating the sidelink WUS resource pool with a transmitting sidelink UE.
20. The method of any of the clauses 14-19, further comprising receiving, from a base station, a control resource set (CORESET) and search space for the WUS.
21. The method of any of the clauses 14-20, in which the WUS sidelink resource pool comprises time division multiplexed, frequency domain multiplexed, and/or space division multiplexed automatic gain control (AGC) resources and WUS resources for a plurality of users.
22. The method of any of the clauses 14-21, in which each space division multiplexed AGC resource is one symbol or one-half of a symbol, each gap is one symbol or one-half of a symbol, and each WUS resource is one symbol.
23. The method of any of the clauses 14-22, in which each slot comprises an AGC resource comprising a single symbol for all of the plurality of users, and a gap between each WUS resource of each of the plurality of users, or each slot comprises a single AGC symbol at a beginning of a slot and a single gap symbol at an end of the slot.
24. The method of any of the clauses 14-23, in which the sidelink WUS resource pool is in a first slot and the data transmission resource pool is in a second slot, different from the first slot.
25. The method of any of the clauses 14-24, in which the sidelink WUS resource pool is in a first subchannel and the data transmission resource pool is in a second subchannel, different from the first subchannel.
26. The method of any of the clauses 14-25, in which the sidelink WUS resource pool is time division multiplexed with the sidelink data transmission resource pool, within a slot.
27. An apparatus for wireless communication by a sidelink user equipment (UE), comprising:
a memory; and
at least one processor coupled to the memory and configured:
to select a sidelink wakeup signal (WUS) resource from a dedicated sidelink WUS resource pool, the sidelink WUS resource pool differing from a sidelink data transmission resource pool; and
to transmit, to a receiver, a WUS on the selected sidelink WUS resource.
28. The apparatus of clause 27, in which the selected sidelink WUS resource is assigned to the receiver.
29. The apparatus of clause 27 or 28, in which the at least one processer is further configured to select the sidelink WUS resource by sensing across the sidelink WUS resource pool, and randomly selecting the sidelink WUS resource based on the sensing.
30. The apparatus of any of the clauses 27-29, in which the at least one processer is further configured to receive, from a base station, a control resource set (CORESET) and search space for the WUS.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a sidelink user equipment (UE), comprising:

selecting a sidelink wakeup signal (WUS) resource from a dedicated sidelink WUS resource pool, the sidelink WUS resource pool being separate from and non-overlapping with a sidelink data transmission resource pool; and transmitting, to a receiver, a WUS on the selected sidelink WUS resource.

2. The method of claim 1, in which the selected sidelink WUS resource is assigned to the receiver.

3. The method of claim 2, further comprising receiving, from a base station, a configuration indicating the selected sidelink WUS resource.

4. The method of claim 2, further comprising receiving, from the receiver, a configuration of the selected sidelink WUS resource.

5. The method of claim 1, in which the selecting the sidelink WUS resource comprises:

sensing across the sidelink WUS resource pool; and randomly selecting the sidelink WUS resource based on the sensing.

6. The method of claim 1, in which the selecting the sidelink WUS resource comprises negotiating the sidelink WUS resource pool with the receiver.

7. The method of claim 1, further comprising receiving, from a base station, a control resource set (CORESET) and search space for the WUS.

8. The method of claim 1, in which the WUS sidelink resource pool comprises time division multiplexed, frequency domain multiplexed, and/or space division multiplexed automatic gain control (AGC) resources and WUS resources for a plurality of users.

9. The method of claim 8, in which each AGC resource is one symbol or one-half of a symbol, each gap is one symbol or one-half of a symbol, and each WUS resource is one symbol.

10. The method of claim 8, in which each slot comprises an AGC resource comprising a single symbol for all of the plurality of users, and a gap between each WUS resource of each of the plurality of users, or each slot comprises a single AGC symbol at a beginning of a slot and a single gap symbol at an end of the slot.

11. The method of claim 1, in which the sidelink WUS resource pool is in a first slot and the data transmission resource pool is in a second slot, different from the first slot.

12. The method of claim 1, in which the sidelink WUS resource pool is in a first subchannel and the data transmission resource pool is in a second subchannel, different from the first subchannel.

13. The method of claim 1, in which the sidelink WUS resource pool is time division multiplexed with the sidelink data transmission resource pool, within a slot.

14. A method of wireless communication by a receiving sidelink user equipment (UE), comprising:

determining a sidelink wakeup signal (WUS) resource from a dedicated sidelink WUS resource pool, the sidelink WUS resource pool being separate from and non-overlapping with a sidelink data transmission resource pool; and processing a WUS on the determined sidelink WUS resource.

15. The method of claim 14, in which the determined sidelink WUS resource is assigned to the receiving sidelink UE.

16. The method of claim 15, further comprising receiving, from a base station, a configuration indicating the determined sidelink WUS resource.

17. The method of claim 15, further comprising transmitting, to a transmitting sidelink UE, a configuration of the determined sidelink WUS resource.

18. The method of claim 14, further comprising monitoring all of the sidelink WUS resource pool to determine the sidelink WUS resource.

19. The method of claim 14, in which the determining the sidelink WUS resource comprises negotiating the sidelink WUS resource pool with a transmitting sidelink UE.

20. The method of claim 14, further comprising receiving, from a base station, a control resource set (CORESET) and search space for the WUS.

21. The method of claim 14, in which the WUS sidelink resource pool comprises time division multiplexed, frequency domain multiplexed, and/or space division multiplexed automatic gain control (AGC) resources and WUS resources for a plurality of users.

22. The method of claim 21, in which each space division multiplexed AGC resource is one symbol or one-half of a symbol, each gap is one symbol or one-half of a symbol, and each WUS resource is one symbol.

23. The method of claim 21, in which each slot comprises an AGC resource comprising a single symbol for all of the plurality of users, and a gap between each WUS resource of each of the plurality of users, or each slot comprises a single AGC symbol at a beginning of a slot and a single gap symbol at an end of the slot.

24. The method of claim 14, in which the sidelink WUS resource pool is in a first slot and the data transmission resource pool is in a second slot, different from the first slot.

25. The method of claim 14, in which the sidelink WUS resource pool is in a first subchannel and the data transmission resource pool is in a second subchannel, different from the first subchannel.

26. The method of claim 14, in which the sidelink WUS resource pool is time division multiplexed with the sidelink data transmission resource pool, within a slot.

27. An apparatus for wireless communication by a sidelink user equipment (UE), comprising:

a memory; and at least one processor coupled to the memory and configured:

to select a sidelink wakeup signal (WUS) resource from a dedicated sidelink WUS resource pool, the sidelink WUS resource pool being separate from and non-overlapping with a sidelink data transmission resource pool; and to transmit, to a receiver, a WUS on the selected sidelink WUS resource.

28. The apparatus of claim 27, in which the selected sidelink WUS resource is assigned to the receiver.

29. The apparatus of claim 27, in which the at least one processer is further configured to select the sidelink WUS resource by sensing across the sidelink WUS resource pool, and randomly selecting the sidelink WUS resource based on the sensing.

30. The apparatus of claim 27, in which the at least one processer is further configured to receive, from a base station, a control resource set (CORESET) and search space for the WUS.

* * * * *